United States Patent [19]

Taylor

[11] Patent Number: 4,856,226
[45] Date of Patent: Aug. 15, 1989

[54] VACUUM INSECT ERADICATION DEVICE

[75] Inventor: Adoyal Taylor, Fulton, Miss.

[73] Assignee: A. Q. Oldacre, Somerville, Ala.

[21] Appl. No.: 217,623

[22] Filed: Jul. 11, 1988

[51] Int. Cl.⁴ .................. A01M 1/04; A01M 1/06; A01M 1/08

[52] U.S. Cl. ..................... 43/113; 43/111; 43/122

[58] Field of Search ............ 43/122, 111, 113, 139, 43/142

[56] References Cited

U.S. PATENT DOCUMENTS

| | | | |
|---|---|---|---|
| 3,020,671 | 2/1962 | Potter | 43/113 |
| 3,152,420 | 10/1964 | Pawl | 43/113 |
| 3,196,577 | 7/1965 | Plunkett | 43/113 |
| 4,360,987 | 11/1982 | Lowder | 43/122 |
| 4,519,160 | 5/1985 | McBrayer | 43/113 |

Primary Examiner—Nicholas P. Godici
Assistant Examiner—Michael William Starkweather
Attorney, Agent, or Firm—Jennings, Carter, Thompson & Veal

[57] ABSTRACT

An insect eradication device utilizes an incandescent light source to lure insects into a predetermined zone proximal the apparatus enclosure. A suction fan establishes a sub-atmospheric region within the enclosure. Insects with the predetermined zone are entrained within the resulting high velocity airflow and disintegrated upon entering the closely spaced fan blades. The resulting debris is deposited in a removable collection chamber for periodic disposal.

15 Claims, 1 Drawing Sheet

VACUUM INSECT ERADICATION DEVICE

FIELD OF THE INVENTION

The present invention relates to the control of flying insects. More particularly, the present invention is an apparatus that lures insects into a predetermined area, then captures and eradicates the insects using vacuum controlled suction.

BACKGROUND OF THE INVENTION

Throughout history, inventors have made numerous attempts to solve the perplexing problem of insect control. From inauspicious beginnings with "fly paper" and "fly swatters", insect control technology has gradually improved and in recent years a high level of sophistication has been achieved in the art.

A typical example utilizes ultraviolet lamps to attract insects within an enclosure. Once inside, the insects contact high voltage wires and are immobilized thereon. Although extremely effective, these high voltage devices are inappropriate for many home applications. The ultraviolet lamps create an artificial light which lacks illumination value for a home patio or entranceway. The high voltage wires are dangerous for children and pets, so the devices must be placed a great distance above the ground or in out of the way areas. Most of the designs to date have also been rather unattractive and undesirable for home decor.

Other insect control devices apply vacuum controlled suction to an enclosed space to create a high velocity airflow. Insects are drawn into the draft and carried to a disposal area. The Thybault invention (U.S. Pat. No. 3,750,727, issued August 1973) simply adapted an insect gathering attachment to a common household vacuum cleaner. The Smith device (U.S. Pat. No. 4,141,174, issued February 1979) uses suction to entrap agricultural insects in an enclosure for field population sampling. My own fire ant eradicator (U.S. Pat. No. 4,683,673, issued August 1987) is yet another example of a mobile suction controlled insect eradication device. Stationary vacuum eradication devices such as the Knox invention (U.S. Pat. No. 2,569,722, issued December 1951) have also appeared in prior art references. In Knox, insects entering a showcase are drawn into a complex suction system and subsequently captured in a removable disposal bag.

The aforementioned vacuum controlled devices are impractical for insect control in a residential or outdoor recreational environment. No insect attraction means are incorporated into these devices, so the insect control area is extremely limited. The prior art devices are also relatively complex, requiring maintenance beyond the capabilities of the typical homeowner. The large and unsightly designs are inappropriate for home decor or recreational use. Finally, and perhaps most importantly, the costs of these devices are prohibitive for the homeowner.

SUMMARY OF THE INVENTION

It is the object of the present invention to provide an attractive, low cost means of insect control for use in a home environment. Another object of the present invention is to provide an insect control means for incorporation into home or outdoor recreational light fixtures.

A typical embodiment of the present invention unobtrusively controls insects over a wide area from a light fixture enclosure. The transparent walls of the enclosure are perforated with a plurality of openings allowing insects ready access to the interior region. When the incandescent bulb within the enclosure is illuminated, insects in the vicinity are attracted to a predetermined area immediately surrounding the enclosure.

A blower system located in a narrow housing directly beneath the transparent enclosure area creates subatmospheric pressure within the fixture. Flying insects within the predetermined surrounding area are entrained in the resulting airflow and drawn into the interior region. A transparent barrier surrounding the incandescent bulb restricts the interior region volume and creates a gradually narrowing plenum chamber. The increased air velocity in the plenum areas aids in efficient insect capture. The entrained insects reach maximum velocity just prior to entry into the blower housing.

The blower unit comprises a radial fan powered by a conventional electric motor with sufficient torque to turn the fan at a high velocity. The sharp, closely spaced fan blades fit coextensively within the narrow housing, leaving only a minuscule gap necessary to permit free rotation. Insects entering the blower housing cannot avoid passage through the fan blades. The sharp blade edges kill the pests and may further chop the remnants into small pieces of debris. The disintegrated insect remains are subsequently exhausted from the blower region by the high velocity air.

The debris is finally deposited in a removable collection receptable located below the blower housing. The receptacle may be constructed with wire mesh walls or may contain a disposable element as typically found in household vacuum cleaners. Exhaust air exiting the blower unit desiccates and compacts the debris in the collection chamber for disposal. Periodic cleaning of the receptacle preserves the efficiency of the apparatus.

The present invention advances vacuum insect control technology by feasibly adapting such technology to home or outdoor recreational use. The apparatus is a safe, effective insect control device that may be unobtrusively incorporated into home decor. The compact size also permits use for camping or other outdoor recreational use (powered by rechargeable battery pack). The devices emit light at useful illumination frequencies and require little maintenance. The low cost of each unit insures accessibility for the average homeowner.

BRIEF DESCRIPTION OF THE DRAWINGS

Apparatus embodying features of my invention are depicted in the accompanying drawings which form a portion of this application and wherein.

DESCRIPTION OF A PREFERRED EMBODIMENT

Figure 1:
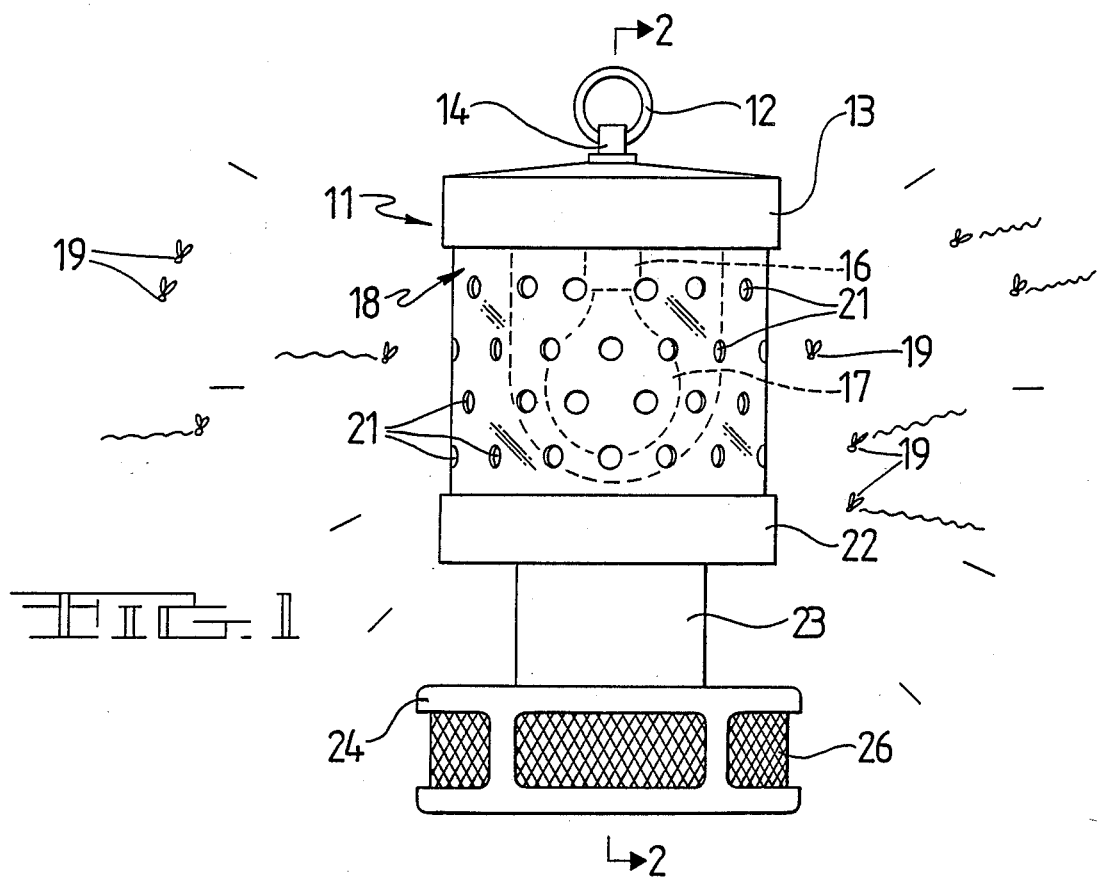
FIG. 1 is a side elevational view of my apparatus as used to eradicate insects.
Figure 2:
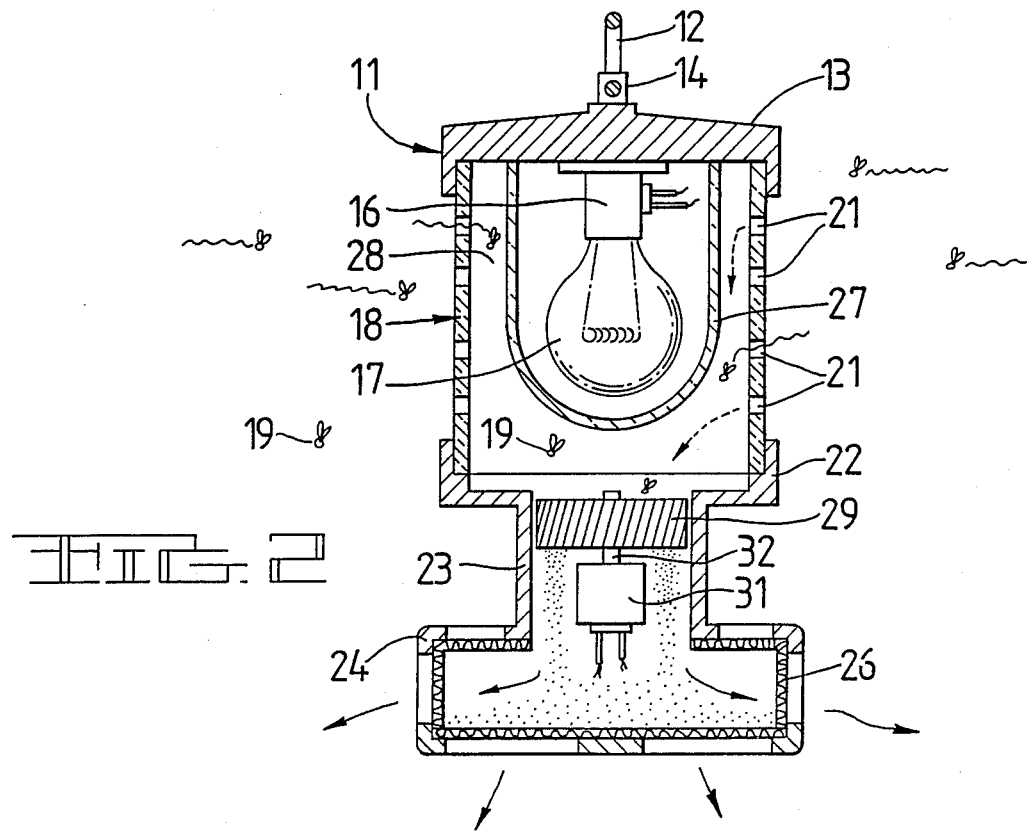
FIG. 2 is a sectional view of the apparatus along line 2—2 of FIG. 1.

Referring to FIGS. 1 and 2, our invention may be seen as an insect control and eradication device that may be incorporated into a common household light fixture. The embodiment shown in FIG. 1 features three main components: an upper chamber, a blower housing, and a lower collection chamber.

The configuration of upper chamber 11 may vary, depending on the intended application of the apparatus.

In the embodiment shown, the apparatus may be suspended from a support by means of hanger ring 12. Hanger ring 12 is attached to chamber housing 13 using hanger support 14. Chamber housing 13 contains a socket 16 for incandescent lamp 17 and also provides an airtight receptacle for attachment of transparent wall 18. Transparent wall 18 may be constructed of heat resistant glass or plexiglass. After insects 19 have been attracted into the vicinity of the apparatus by incandescent lamp 17, multiple orifices 21 allow these insects to gain access to upper chamber 11. Chamber housing 22 supports and provides an airtight receptacle for transparent wall 18. Blower housing 23 attaches to chamber housing 22 and forms an airtight seal therewith.

Collection chamber 24 attaches to blower housing 23 and may be removed for periodic cleaning. Chamber walls 26 may be constructed of any cleanable pervious material such as screen wire or plastic mesh. In an alternative embodiment collection chamber 24 may be fitted with a disposable cloth or paper element.

Referring to FIG. 2, it should be noted that chamber housings 13 and 22 form airtight seals with transparent wall 18. Transparent barrier 27 surrounds incandescent bulb 17 and limits the volume of upper chamber 11, forming plenum areas 28.

Suction from radial blower fan 29, located in blower housing 23, creates high velocity airflow in plenum areas 28. Insects 19 are entrained in this airflow through orifices 21 and thereafter directed through the fan blades. Radial fan 29 is powered by electric motor 31 via vertical shaft 32.

After pulverization in the fan blades, insect debris 33 falls into collection chamber 24. Air is exhausted through pervious chamber walls 26.

While I have shown my invention in but one form, it will be obvious to those skilled in the art that it is not so limited but is susceptible of various changes and modifications without departing from the spirit thereof.

What I claim is:

1. Apparatus for insect eradication comprising:
   (a) an upper chamber with walls of transparent material, said walls having multiple orifices of sufficient diameter to permit passage of insects therethrough;
   (b) luminescent means within said upper chamber for attraction of insects into a predetermined zone proximal said orifices;
   (c) vacuum means for creation of sub-atmospheric pressure within said upper chamber such that insects located within said predetermined zone are entrained in an airflow through said upper chamber and vacuum means;
   (d) a lower pervious collection chamber positioned distal said upper chamber for receipt of exhausted airflow and the contents thereof from said vacuum means.

2. Apparatus as defined in claim 1 wherein said luminescent means comprises one or more single incandescent light bulbs.

3. Apparatus as defined in claim 1 further comprising a barrier disposed about said luminescent means defining an enhanced airflow region within said upper chamber by reducing the volume of said chamber.

4. Apparatus as defined in claim 1 wherein said vacuum means comprises a blower unit contained within a housing positioned between said upper chamber and said low chamber, said housing serving as the airflow conduit therebetween.

5. Apparatus as defined in claim 4 wherein said blower unit comprises a radial suction fan powered by an electric motor through a shaft aligned parallel to the longitudinal axis of said housing.

6. Apparatus as defined in claim 5 wherein said fan is constructed of a plurality of closely spaced radial blades, said blades fitting coextensively with said housing so only minimal clearance remains therebetween for rotation.

7. Apparatus as defined in claim 6 wherein the airflow and insects entrained therein enter the closely spaced blades of said radial fan, are disintegrated thereby, and are thereafter exhausted into said lower pervious collection chamber.

8. Apparatus as defined in claim 1 wherein said lower collection chamber comprises a removable receptacle adapted for the collection and retention of debris contained within the exhaustive airflow received after passage through said vacuum means.

9. An insect control device for incorporation into a light fixture comprising:
   (a) means for attracting insects into an effective area surrounding said fixture;
   (b) a plenum for establishing a high velocity airflow region about said means for attracting, wherein said plenum is defined by a perforated transparent wall enclosing said means for attracting, said perforations being of sufficient diameter to permit passage of insects from said effective area into said plenum;
   (c) vacuum means for applying a sub-atmospheric pressure to said plenum such that insects located within said effective area are entrained in an airflow through said plenum and said vacuum means whereby said insects are destroyed;
   (d) a collection chamber for receipt of exhausted airflow and insects from said vacuum means.

10. An insect control device as defined in claim 9 wherein said means for attracting is an incandescent light source.

11. An insect control device as defined in claim 9 wherein a barrier disposed about the means of attraction further defines said plenum as the volume between said barrier and said perforated walls.

12. An insect control device as defined in claim 9 wherein said vacuum means comprises a radial fan powered by an electric motor, said fan being coextensive with a housing positioned between said plenum and said collection chamber.

13. An insect control device as defined in claim 12 wherein said electric motor turns said fan on a shaft aligned parallel with the longitudinal axis of said plenum.

14. An insect control device as defined in claim 12 wherein said fan is comprised of a plurality of closely spaced blades, said blades admitting the airflow and impacting insects contained therein, then subsequently exhausting said airflow and insects into said collection chamber.

15. An insect control device as defined in claim 9 wherein said collection chamber is a pervious removable container for disposal of insect debris received from said vacuum means.

* * * * *